No. 817,397. PATENTED APR. 10, 1906.
N. E. SKINNER.
STRAINER.
APPLICATION FILED OCT. 27, 1905.
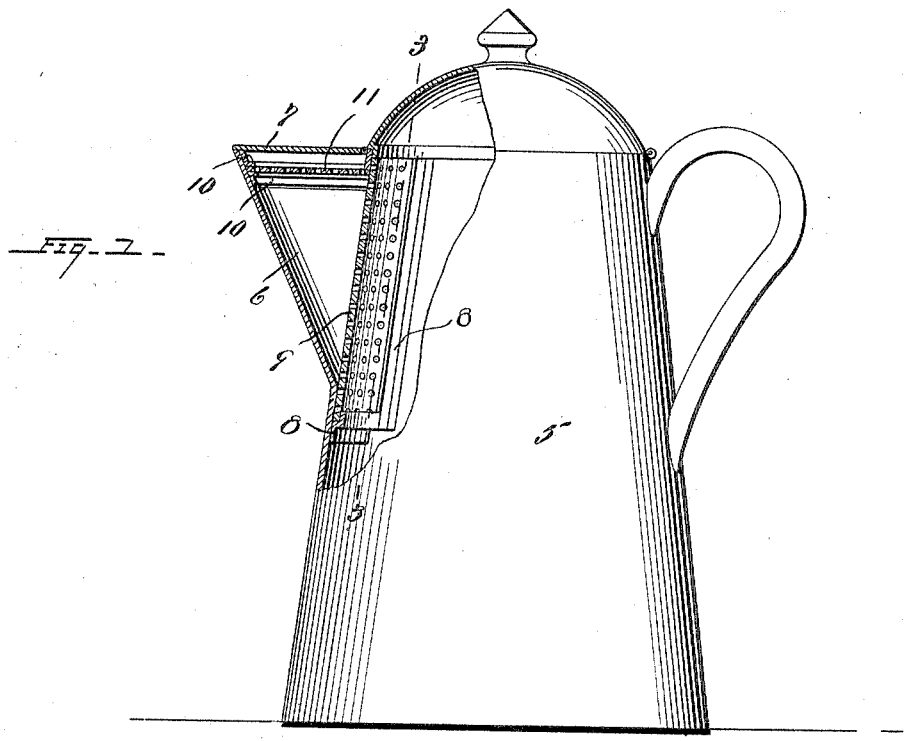
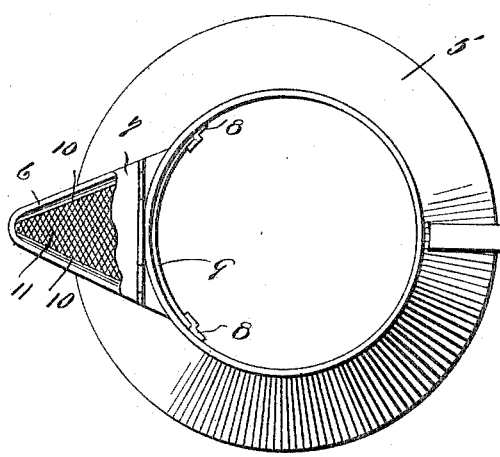
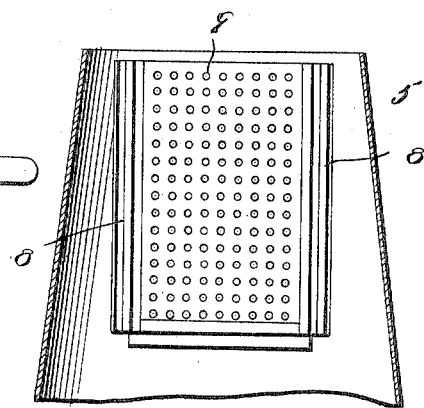
WITNESSES:
INVENTOR
Nancy E. Skinner
By Milo B. Stevens and Co.
Attorneys.

UNITED STATES PATENT OFFICE.

NANCY E. SKINNER, OF WEST LORNE, CANADA.

STRAINER.

No. 817,387.   Specification of Letters Patent.   Patented April 10, 1906.

Application filed October 27, 1905. Serial No. 284,664.

*To all whom it may concern:*

Be it known that I, NANCY ELIZABETH SKINNER, a citizen of the Dominion of Canada, residing at West Lorne, in the county of Elgin and Province of Ontario, Canada, have invented certain new and useful Improvements in Strainers; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

My invention is a strainer for coffee and tea pots or other vessels, and has for its object to provide a strainer embodying certain novel features of construction hereinafter described and claimed, whereby the same can be readily removed from the vessel for the purpose of cleaning the same.

In the accompanying drawings, Figure 1 is an elevation, partly in section, of a coffee-pot provided with my strainer. Fig. 2 is a plan view. Fig. 3 is a sectional view on the line 3 3 of Fig. 1.

Referring specifically to the drawings, 5 denotes a suitable vessel, a coffee-pot being indicated in the present instance, although the invention is readily applicable to teapots or other vessels. The pouring-spout is indicated at 6 and may be provided with a hinged cover 7 for closing the discharge end.

Inside the vessel adjacent the inlet of the spout are guide-strips 8, which receive a strainer 9, arranged to extend over the said inlet. Near the discharge end of the spout are secured guide-strips 10, which receive a second strainer 11. Both strainers can be readily removed from the vessel for cleaning or when it is desired to pour out the contents thereof without straining.

The space between the guide-strips 10, in which the strainer 11 is supported, communicates with the opening in the vessel which forms the spout-inlet, and when said strainer is in position its rear end fits against the strainer 9, which prevents any unstrained fluid from passing out of the spout. The strainer 11 is slidable into and out of the spout through the inlet thereof upon removal of the strainer 9.

Having thus described my invention, what is claimed as new, and desired to be secured by Letters Patent, is—

The combination with a vessel having a pouring-spout, and a removable strainer over the spout-inlet, said spout having a groove adjacent its outlet, which groove opens at its rear end into the spout-inlet, of a strainer slidable into and out of the aforesaid groove through the spout-inlet.

In testimony whereof I affix my signature in presence of two witnesses.

NANCY E. SKINNER.

Witnesses:
ELIZABETH J. PRICE,
LILLIAN A. SPARKLIN.